US011972627B2

(12) United States Patent
Muthu et al.

(10) Patent No.: US 11,972,627 B2
(45) Date of Patent: Apr. 30, 2024

(54) INTELLIGENT DATA EXTRACTION SYSTEM AND METHOD

(71) Applicant: Accenture Global Solutions Limited, Dublin (IE)

(72) Inventors: Loganathan Muthu, Guduvancheri (IN); Rahul Kotnala, Chennai (IN); Srinivasan Krishnan Rajagopalan, Chennai (IN); Peter Ashly Gopalan, Chennai (IN); Manikandan Chandran, Chennai (IN); Anand Yesuraj Prakash, Chennai (IN); Simantini Deb, Navi Mumbai (IN); Vijay Dhandapani, Chennai (IN); Harbhajan Singh, Dublin (IN); RBSanthosh Kumar, Chennai (IN); Lokesh Venkatappa, Bangalore (IN); Ramakrishnan Raman, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 398 days.

(21) Appl. No.: 17/552,542

(22) Filed: Dec. 16, 2021

(65) Prior Publication Data

US 2023/0196813 A1 Jun. 22, 2023

(51) Int. Cl.
*G06V 30/414* (2022.01)
*G06V 30/19* (2022.01)
(Continued)

(52) U.S. Cl.
CPC ...... *G06V 30/414* (2022.01); *G06V 30/19107* (2022.01); *G06V 30/19147* (2022.01);
(Continued)

(58) Field of Classification Search
CPC ..... G06V 30/40–418; G06V 30/19107; G06V 30/19147
See application file for complete search history.

(56) References Cited

U.S. PATENT DOCUMENTS

2011/0249905 A1 10/2011 Singh et al.
2020/0104350 A1 4/2020 Allen et al.
(Continued)

OTHER PUBLICATIONS

Khan, Saqib Ali, et al. "Table structure extraction with bi-directional gated recurrent unit networks." 2019 International Conference on Document Analysis and Recognition (ICDAR). IEEE, 2019. (Year: 2019).*

(Continued)

*Primary Examiner* — Geoffrey E Summers
(74) *Attorney, Agent, or Firm* — Plumsea Law Group, LLC

(57) ABSTRACT

A system and method for automating and improving data extraction from a variety of document types, including both unstructured, structured, and nested content, is disclosed. The system and method incorporate an intelligent machine learning model that is designed to intelligently identify chunks of text, map the fields in the document, and extract multi-record values. The system is designed to operate with little to no human intervention, while offering significant gains in accuracy, data visualization, and efficiency. The architecture applies customized techniques including density-based adaptive text clustering, tabular data extraction based on hierarchical intelligent keyword searches, and natural language processing-based field value selection.

20 Claims, 11 Drawing Sheets

(51) Int. Cl.
  *G06V 30/412* (2022.01)
  *G06V 30/413* (2022.01)
  *G06V 30/416* (2022.01)

(52) U.S. Cl.
  CPC .......... *G06V 30/412* (2022.01); *G06V 30/413* (2022.01); *G06V 30/416* (2022.01)

(56) References Cited

U.S. PATENT DOCUMENTS

| | | | | |
|---|---|---|---|---|
| 2020/0175267 | A1* | 6/2020 | Schäfer | G06V 30/413 |
| 2021/0117668 | A1* | 4/2021 | Zhong | G06N 20/00 |
| 2021/0319217 | A1* | 10/2021 | Wang | G06T 7/10 |
| 2021/0366099 | A1 | 11/2021 | Liao et al. | |
| 2023/0110931 | A1* | 4/2023 | Kim | G06V 30/413 382/180 |

OTHER PUBLICATIONS

Zucker, Arthur, et al. "ClusTi: Clustering method for table structure recognition in scanned images." Mobile Networks and Applications 26.4 (2021): 1765-1776. (Year: 2021).*

Dahl, C. M. et al., "Applications of machine learning in document digitisation", arXiv preprint arXiv:2102.03239, published Feb. 5, 2021 < URL: https://arxiv.org/pdf/2102.03239.pdf >.

Rastan, R., "Automatic tabular data extraction and understanding", Dissertation, UNSW Sydney, published 2017 < URL: https://unsworks.unsw.edu.au/bitstreams/48ce1233-828a-4965-b2b6-2f9d00d9285a/download >.

Ramamurthy, R. et al., "Automatic Indexing of Financial Documents via Information Extraction", 2021 IEEE Symposium Series on Computational Intelligence (SSCI), Orlando, FL, USA, 2021, pp. 01-05, published Dec. 7, 2021 < URL: https://ieeexplore.ieee.org/document/9659977 >.

* cited by examiner

INTELLIGENT DATA EXTRACTION SYSTEM AND METHOD

TECHNICAL FIELD

The present disclosure generally relates to the extraction, validation, and comparison of data. More specifically, the present disclosure generally relates to a system and method for the intelligent extraction and analysis of loan information from scanned unstructured and structured documents.

BACKGROUND

Many industries are required to create and/or maintain records for purposes of compliance and customer service. These records typically incorporate tabular presentations to organize their data. Tabular presentations offer a systematic yet highly logical way to represent data. As data storage increases at unprecedented rates, the automatic extraction of data for future use has remained a challenge. As the volume of data increases, so does the complexity of the tables, leading to errors in the compilation of data. Meanwhile, manual data extraction is slow and repetitive which can disengage an employee. These errors can easily snowball into larger problems. Although optical character recognition (OCR) technology has been used to handle address tabular data extraction, the approach is generally unsuccessful as OCR alone is unable to reliably identify tables in a document, recognize the type of table (such as comparison reports or presentation reports), and frequently fails to handle the variety of structural layouts and visual relationships that are used in tabular presentations.

There is a need in the art for a system and method that addresses the shortcomings discussed above.

SUMMARY

A system and method are disclosed for automating and improving data extraction from a variety of document types, including unstructured, structured, and nested content in tabular presentations. The system and method solve the problems discussed above by providing a machine learning model that is designed to intelligently identify chunks of text, map the fields in the document, and extract values from complex tables. The system generates a plurality of maps that include information about the location of a value for fields in a document, and then implements a specially trained neural network model to select an extraction map from the plurality of maps that is most likely to accurately extract data from a given document, thereby offering significant improvements from conventional tabular data extraction techniques. The system is designed to operate with little to no human intervention, with increased accuracy, data visualization, and efficiency. The architecture incorporates customized techniques including density-based adaptive text clustering, tabular data extraction based on hierarchical intelligent keyword searches, and natural language processing-based field value selection.

In one aspect, the disclosure provides a method of performing intelligent data extraction from documents. A first step of the method includes receiving, at a server and from a first data source, a first document including a first content, and a second step of identifying a first set of text chunks in the first content. The method also includes a third step of performing, at the server, adaptive density-based spatial clustering on the first set of text chunks, thereby identifying clusters of text in the first content, and a fourth step of generating a plurality of maps based on values captured manually from a set of training documents, the plurality of maps including a first map, and each map including information about the location of a value for the first field in a document. A fifth step includes training, at the server, a neural network model to select an extraction map from the plurality of maps that is most likely to accurately extract data from the first field of the first document based on the identified clusters of text. In addition, a sixth step includes selecting from the plurality of maps, at the server and using the neural network model, the first map to serve as the extraction map. Furthermore, the method includes a seventh step of applying the trained neural network to extract, at the server, a first data from the first field based on the first map and an eighth step of generating a visualization table/dashboard presenting the extracted first data.

In another aspect, the disclosure provides a system for performing intelligent data extraction from documents. The system includes a processor and machine-readable media including instructions which, when executed by the processor, cause the processor to receive, at a server and from a first data source, a first document including a first content, and to identify a first set of text chunks in the first content. The instructions further cause the processor to perform, at the server, adaptive density-based spatial clustering on the first set of text chunks, thereby identifying clusters of text in the first content, and to generate a plurality of maps based on values captured manually from a set of training documents, the plurality of maps including a first map, and each map including information about the location of a value for the first field in a document. In addition, the instructions cause the processor to train, at the server, a neural network model to select an extraction map from the plurality of maps that is most likely to accurately extract data from the first field of the first document based on the identified clusters of text, and to select from the plurality of maps, at the server and using the neural network model, the first map to serve as the extraction map. Finally, the instructions cause the processor to apply the trained neural network to extract, at the server, a first data from the first field based on the first map, and generate a visualization table presenting the extracted first data.

In another aspect, the disclosure provides a system that includes one or more computers and one or more storage devices storing instructions that are operable, when executed by the one or more computers, to cause the one or more computers to receive, at a server and from a first data source, a first document including a first content, and to identify a first set of text chunks in the first content. The instructions further cause the one or more computers to perform, at the server, adaptive density-based spatial clustering on the first set of text chunks, thereby identifying clusters of text in the first content, and to generate a plurality of maps based on values captured manually from a set of training documents, the plurality of maps including a first map, and each map including information about the location of a value for the first field in a document. In addition, the instructions cause the one or more computers to train, at the server, a neural network model to select an extraction map from the plurality of maps that is most likely to accurately extract data from the first field of the first document based on the identified clusters of text, and to select from the plurality of maps, at the server and using the neural network model, the first map to serve as the extraction map. Finally, the instructions cause the one or more computers to apply the trained neural network to extract, at the server, a first data from the first field based on the first map, and generate a visualization table presenting the extracted first data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The following embodiments describe systems and methods for intelligent data extraction. The proposed systems and methods apply machine learning techniques to intelligently extract and analyze information from complex scanned documents (structured and unstructured) against data in a separate servicing platform. For example, in some embodiments, the information may be loan information and the documents may be mortgage documents. In such an example, the separate servicing platform may be a platform used by a lending company to manage their business. A built-in business rule algorithm combined with the machine learning capability thereby significantly reduces time-consuming and error-prone manual efforts through auto-validation of data fields. The disclosed information extraction systems and methods are highly customizable for implementation across multiple industries and regions. Thus, although the examples described herein are directed toward improvements of auditing in the mortgage industry, it may be appreciated that the proposed techniques may be readily utilized outside of the mortgage industry and for purposes other than auditing. For example, the proposed systems may be implemented by insurance companies, accounting firms, financial institutions, research facilities that generate large amounts of data, warehouse managers, or more broadly by any entity that rely on complex tables for data storage.

As will be discussed in greater detail below, the disclosed systems and methods can also be configured to generate business insights which can be used to facilitate day-to-day business decisions, such as staffing, gauge optimal inventory, and reduce training lead time by streamlining of both upstream and downstream processes. Additionally, the disclosed system and methods can extract data with improved accuracy compared with conventional methods. In addition, the processes used are designed to comply with regulatory requirements, reduce application licensing costs, manage volume peaks and valleys, improve capacity leading to additional volumes, minimize dependency on separate applications, and allow for faster onboarding of new features.

Figure 1:
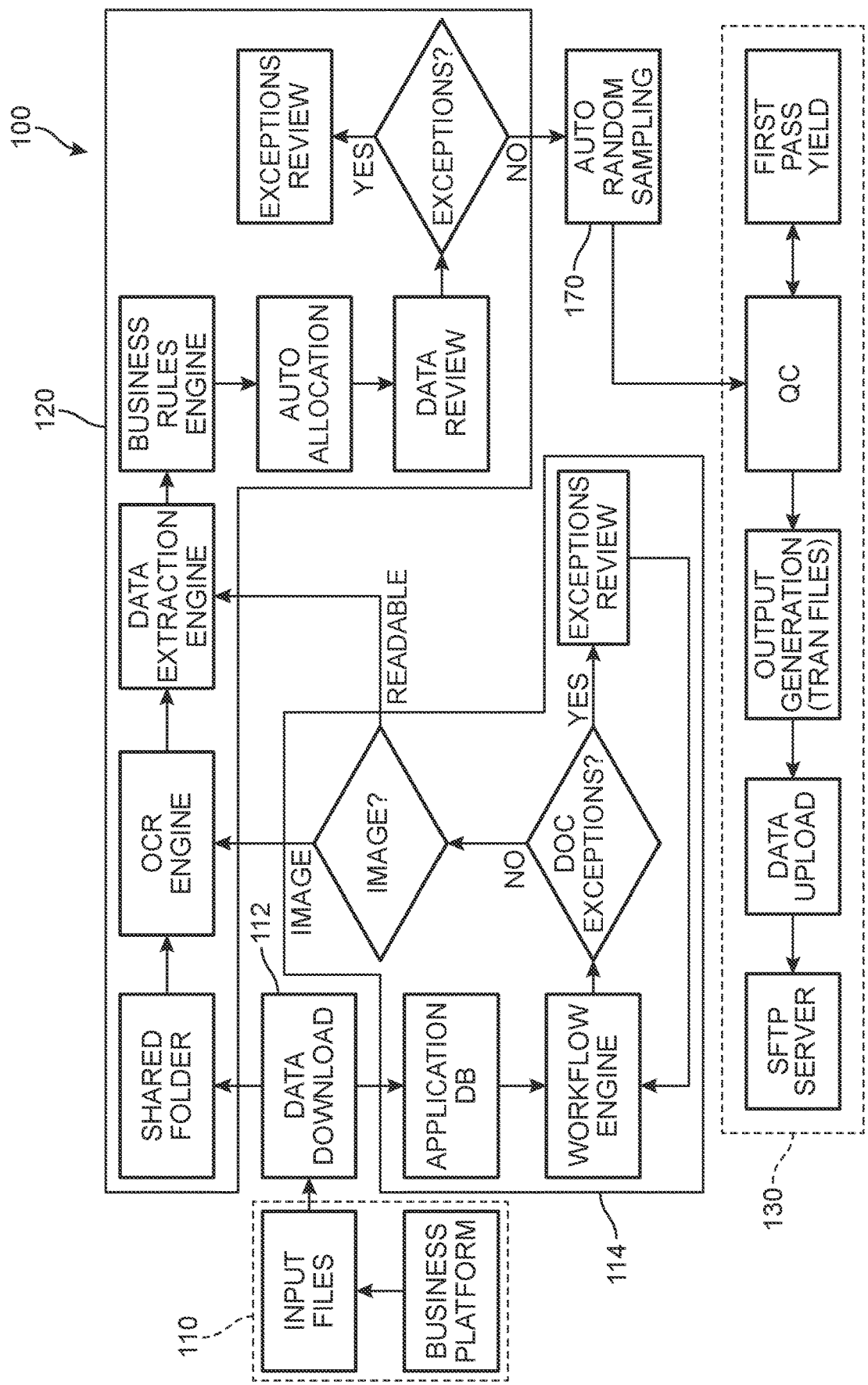
FIG. 1 is a schematic high-level diagram of an embodiment of an intelligent data extraction architecture process flow.

Referring to FIG. 1, for purposes of introduction, an example of a business process flow 100 is depicted. The flow 100 includes a first stage 110 in which a business platform provides input data for download 112 to the system. For example, in some embodiments, the business platform may include a platform that a business uses for its operations. In some embodiments, a business platform can refer to sources such as Black Knight MSP®, MetaSource, RealPage®, ICE Mortgage Technology®, SnapDocs®, CoreLogic®, a general referral file, or other software for mortgage financing, closing, and home equity lending and/or servicing. Input files can include documents, files, and/or data containing information of interest in the context of a situation, such as the situation of processing a loan application. For example, in some embodiments, the documents may include loan documents, loan data, or other types of files and data.

Following the download 112 of the input files, for example using WinSCP or MoveIT, the data can be transferred to multiple locations for further processing. Some or all components of the proposed system can be hosted on a remote server and/or other SaaS (Software as a Service) applications. For example, one or more resources of the system may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

In a first pathway shown passing through a second stage 120, the data is delivered to a shared folder and optical character recognition (OCR) is performed via an OCR engine, such as Tesseract 4.0. In addition, in a second pathway that first passes through mid-stage 114, data is delivered to the application database, and a workflow engine determines whether the data includes any document exceptions, which will be further reviewed in an exceptions review step. In different embodiments, the application can be developed using C# .NET, ASP .NET 2016, HTML 5, JSON, XML, Java Script, SQL XML, Node.js, SMTP, or other programming languages. In addition, the database can run on an SQL or other server.

In cases in which the data includes an image, the image is passed to the OCR engine of the second stage 120. The data is then extracted by an information extraction engine, and a business rules engine outputs the relevant data for auto allocation. The auto allocated data is reviewed, and the system again determines whether the data includes any exceptions, which will be further reviewed in an exceptions review step. If there are no exceptions, auto random sampling 140 is applied and the output is provided to a third stage 130. The output undergoes quality control, and a first pass yield can be produced. In some embodiments, for security purposes, output generation (e.g., TRAN files) is then uploaded to a secure file transfer protocol (SFTP) server.

To provide further context, in some embodiments, the process 100 can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. Furthermore, data from the app server can be shared with an SFTP server that receives the TRAN and exception data filed and provides documents, cenbase files, referral data files, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the document processing and/or any other software capable of being provided via a cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

In different embodiments, applications of the system are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or cloud server may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment, such as a web-based integrated development environment that is accessible from any device with a web browsing application browser. Some non-limiting examples of such frameworks include Microsoft.NET™, the EMC™ integrated development environment, the Microsoft™ Visual Studios integrated development environment for writing and debugging code, and the Eclipse™ integrated development environment for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below.

Furthermore, as noted earlier, the system can incorporate a specialized optical character recognition (OCR) engine 160 to aid in data extraction. In some implementations, the OCR engine may include an OmniPage® OCR engine, a Google® Cloud Vision API OCR engine, Microsoft® Azure Computer Vision API OCR engine, an IBM® Bluemix OCR engine, and/or the like. In some implementations, the OCR engine may convert the documents into an electronic format (e.g., the digitized documents). Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, identification documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

Figure 2:
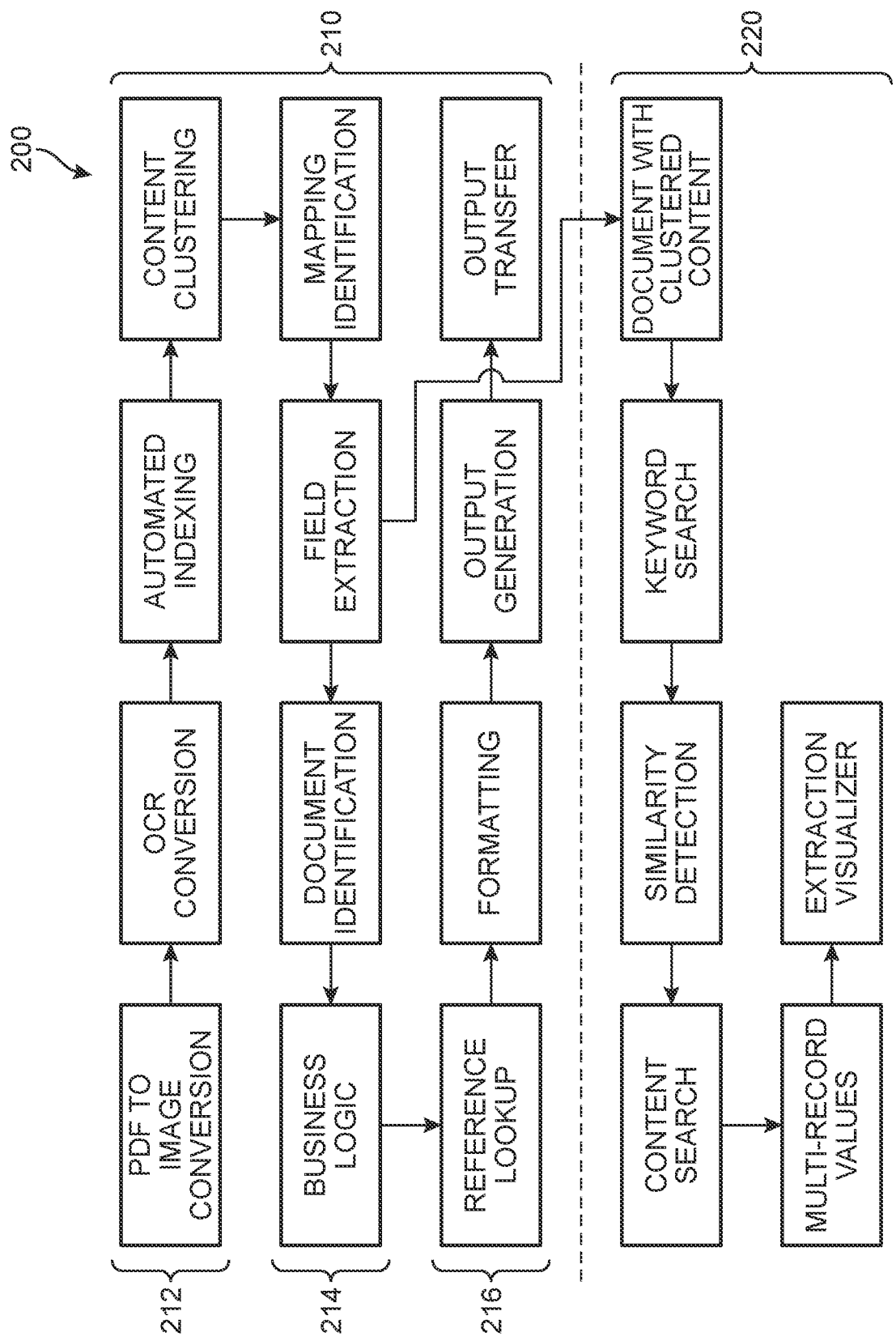
FIG. 2 is a schematic flow diagram of an intelligent data extraction process for documents, according to an embodiment.

FIG. 2 depicts a flow diagram representing an overview of an embodiment of a data extraction process flow ("flow") 200. A document flow stage 210, which for purposes of reference includes three segments 212, 214, and 216 is followed by a field extraction stage 220. In a first segment 212 of the document flow stage 210, documents such as PDFs are converted to images, which are then processed by an OCR engine (e.g., Tesseract or other machine learning algorithms and/or PDF.js, Node.js, etc.) for conversion and parsing. The output is automatically indexed to allow for bookmarks or header searches.

For purposes of clarity, specific terms are defined below that are related to the system: (a) Chunk—individual phrase/word(s) of text identified in a OCR-ed document along with location and size; (b) Clustering—grouping of the chunks into phrases, sentences and paragraphs; (c) ICD—inter chunk distance, referring to the distance between two chunks or groups of chunks; (d) Distance Function—function that is used to calculate the inter chunk distance between chunks and chunk groups when clustering the chunks in a document page; (e) Map—information that details the location of a value for a field in a document, where the map may contain multiple keywords in hierarchies to locate the values; (f) Epsilon—used by DBSCAN algorithm for clustering, calculated based on the distance matrix, where the Epsilon value is a threshold of the minimum number of chunks needed in a region to be considered for the current cluster; (g) Edge Padding Ratio—ratio of the empty region around a paragraph to the region with text, used to identify lines/phrases that appear adjacent to a paragraph but are not part of the paragraph and exclude them; and (h) Hanging Line Detection—detection of lines of text at beginning and end of a paragraph and including them in the cluster.

Content clustering, whereby content of OCR-ed source documents is parsed and chunks are identified, is performed next. Each chunk will contain text and location. In addition, an Inter Chunk Distance (ICD) is calculated using a custom distance function for all chunks to form an ICD Matrix. An Epsilon value, required for DBSCAN (Density-Based Spatial Clustering of Applications with Noise) is calculated based on the distance matrix, and the chunks are then clustered with the modified DBSCAN-based clustering algorithm to find text groups/phrases and paragraphs.

In a second segment 214, mapping identification occurs, whereby maps are generated automatically with correct values captured manually from the documents for training by a map generator engine. Fields are extracted (see field extraction stage 220), documents are identified using identifier expressions, and business logic is applied using logic expressions and workflow orchestration. In a third segment 216, reference lookup for the document occurs using pre-defined codes, and formatted using the pre-defined format expressions. The output is generated using predefined formats, and transferred (see FIG. 1) via SFTP and/or WinSCP.

As noted above, the field extraction stage 220 occurs with respect to documents with clustered content. A keyword search using multiple keys, regular expressions, and min similarity occurs. Similarity detection based on content similarity and Levenshtein distance is performed, and the content searched (e.g., search area identification, search area reduction, regex value patterns, etc.). Multi-record values are obtained using primary key extraction and record association. In a final step, the extracted data is visualized to allow for review of the extraction, keywords, search area, and values.

In different embodiments, the extraction is performed using a specially trained model. The model is based on a map generated following the content clustering processing using the common and/or related fields (i.e., features) extracted from the document, where a map detector identifies the map identification (i.e., output) to be used to extract a field in the extraction process. Some non-limiting examples of such features include Field Information (e.g., Field Name, Data Type), Document Information (e.g., Note), Loan information that can affect the extraction map (e.g., Loan Type, Zone), Related fields Fields that influence the map for another field, and Common fields that are not dependent on any other field.

The generated map and values of common and/or related fields are used to train a neural network model for identifying the map best suited for a document field. The trained model is then used to identify the best map for fields and perform the data extraction. Thus, during extraction, the values of related fields are used along with the trained model to identify the map. The identified map is then used to extract the field. The extractor uses Levenshtein Distance for locating text without an exact match in the document. In some embodiments, a machine learning model is used to detect data included in the digitized documents, including but not limited to a Google™ API machine learning model, a Microsoft™ Azure API machine learning model, an IBM™ Bluemix API machine learning model, a classifier machine learning model, etc. In some embodiments, the system may perform a training operation on the machine learning model with the digitized documents or with information that includes different inputs. For example, the system may separate the digitized documents into a training set, a validation set, a test set, and so forth. In some implementations, the system may train the machine learning model using, for example, an unsupervised training procedure and based on the training set of the digitized documents. For example, the system may perform dimensionality reduction to reduce the digitized documents to a minimum feature set, thereby reducing resources (e.g., processing resources, memory resources, and/or the like) to train the machine learning model, and may apply a classification technique to the minimum feature set. Additionally, or alternatively, the system may use a support vector machine (SVM) classifier technique to generate a non-linear boundary between data points in the training set. In this case, the non-linear boundary is used to classify test data into a particular class.

Additionally, or alternatively, the system may train the machine learning model using a supervised training procedure that includes receiving input to the machine learning model from a subject matter expert or other operator, which may reduce an amount of time, an amount of processing resources, and/or the like to train the machine learning model of activity automatability relative to an unsupervised training procedure. In some embodiments, the system may use one or more other model training techniques, such as a neural network technique, a latent semantic indexing technique, and/or the like. For example, the system may perform an artificial neural network processing technique (e.g., using a two-layer feedforward neural network architecture, a three-layer feedforward neural network architecture, and/or the like) to perform pattern recognition with regard to patterns of whether a document includes a particular response type or input value. In this case, using the artificial neural network processing technique may improve an accuracy of the trained machine learning model generated by the system by being more robust to noisy, imprecise, or incomplete data, and by enabling the electronic document platform to detect patterns and/or trends undetectable to human analysts or systems using less complex techniques. In some embodiments, the machine learning model may include a support vector machine model, a linear regression model, a logistic regression model, a naive Bayes model, a linear discriminant analysis model, a decision tree model, a k-nearest neighbor model, a neural network model, and/or the like.

Figure 3:
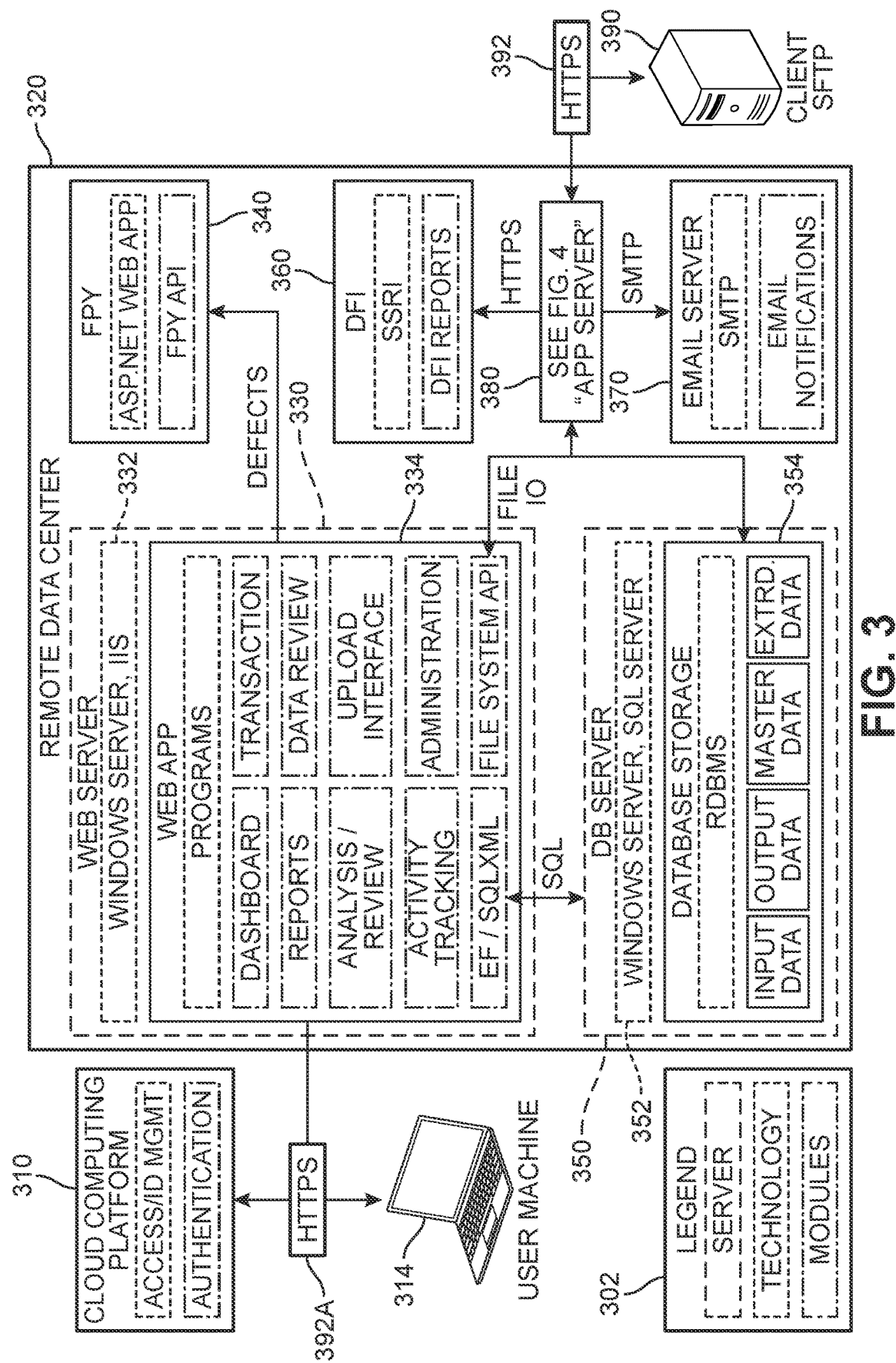
FIGS. 3 and 4 are a schematic diagram of an embodiment of an architecture of an application for intelligent data extraction.

For purposes of context, FIG. 3 presents an embodiment of a data extraction application architecture 300. In FIG. 3, the application architecture 300 can be seen to include a remote data center 320 which is in communication with a user computing machine 314 and a cloud computing platform 310 such as Microsoft® Azure via a network 392a ("HTTPS"). The cloud computing platform 310 is configured to handle cloud-based identity and access management services (e.g., via Microsoft® Azure AD and other authentication services). The data center 320 manages a plurality of components, including a web server 330, a database server 350, an FPY component 340, a DFI component 360, an app server 380 (see FIG. 4), and an email server 370. For purposes of reference, a legend 302 is included in which three types of dashed lines are used to discriminate between components associated with the server, technology, or general modules. The web server 330 includes components such as a Windows® server or Internet Information Service 332. In addition, the web server 330 includes a web app 334 that manages, administers, and provides programs, as well as a dashboard, and a mechanism by which to obtain reports and perform transactions, review data, perform analysis/review, track activity, and provide an upload interface. Defects are reported to the FPY component 340. The file system API communicates with the app server 380 while an entity framework (EF) and SQLXML communicates with database server 350. The database server 350 can include a Windows® server and/or SQL server 352, and database storage 354, which includes a relational database such as but not limited to an RDBMS, as well as input data, output data, master data, and EXTRD data. The database server 350 is also in communication with the app server 380, which further transfers data to DFI component 360 and email server 370, as well as a client SFTP 390 via network 392b.

Figure 4:
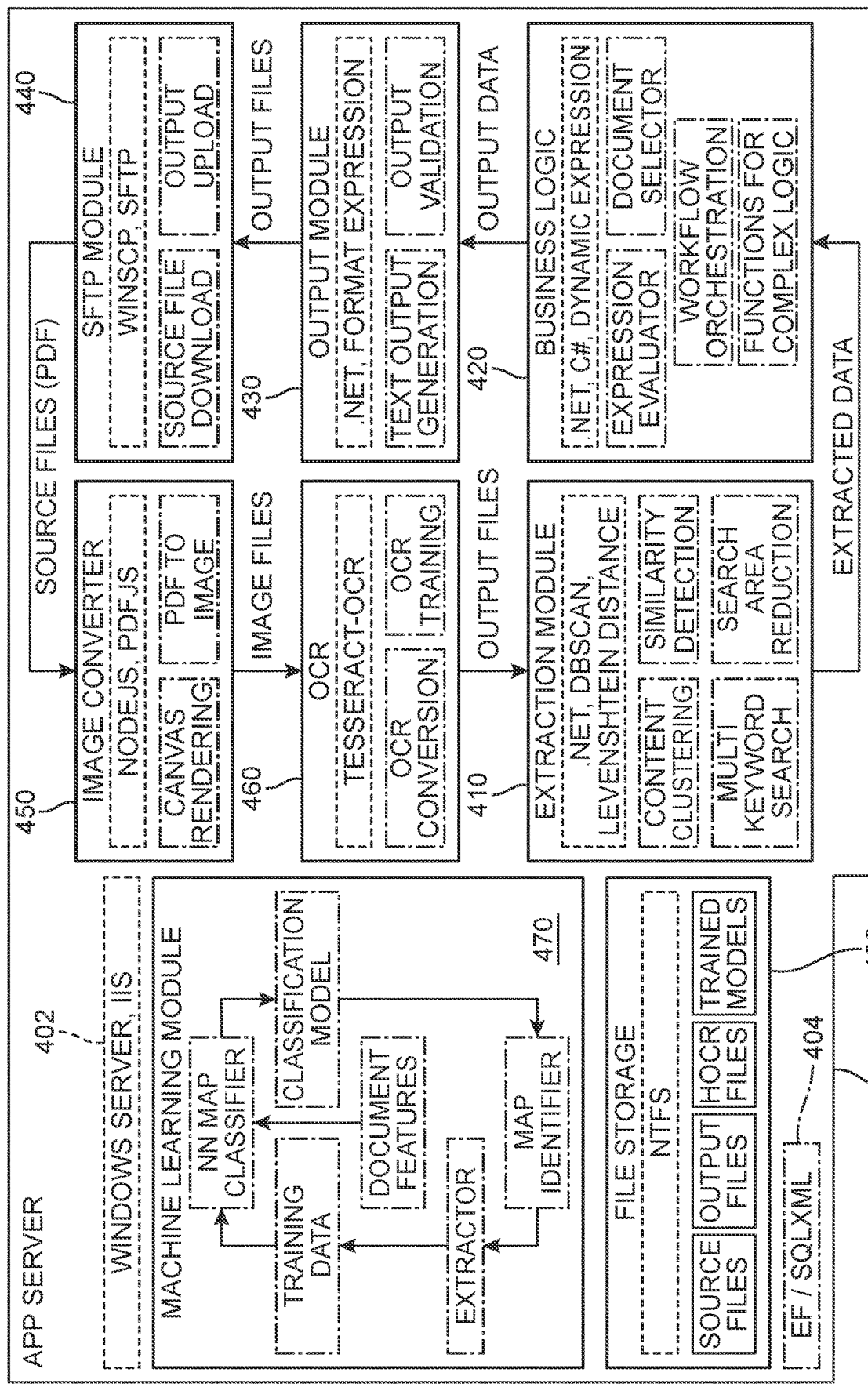

Referring to FIG. 4, an expanded schematic diagram of the app server 380 is presented. The app server 380 includes components such as a Windows® server or Internet Information Service 402, a machine learning module ("ML module") 470, file storage 480, and an interconnected group of components including an extraction module 410, business logic 420, output module 430, SFTP module 440, image converter 450, and OCR engine 460. As discussed earlier, the ML module 470 is configured to provide an optimally trained model for extraction. In FIG. 4, this ongoing training cycle comprises the use of document features in identifying a map, an extraction of specific features of the identified map produces training data for a neural network map classifier that is implemented by the system as its classification model for the current dataset. File storage, which can utilize New Technology File System (NTFS), can store source files, output files, HOCR files, and/or trained models.

As source files (e.g., PDFs) are obtained from the SFTP module 440, for example via a source file downloader, the image converter 450 performs canvas rendering and PDF-to-Image operations. These image files are sent to the OCR engine 480 for OCR conversion and OCR training (e.g., via Tesseract OCR). The output of the OCR engine 480 is conveyed to the extraction module 410, which performs functions such as content clustering, similarity detection, multi-keyword search, and search area reduction. The extracted data is then sent to the business logic 420, which performs functions such as workflow orchestration, complex logic functions, document selection, and expression evaluation. This processed data is shared with the output module 430 which prepares the data as text output and validates the output. Finally, the output is sent to the SFTP module 440 for output upload.

Figure 5:
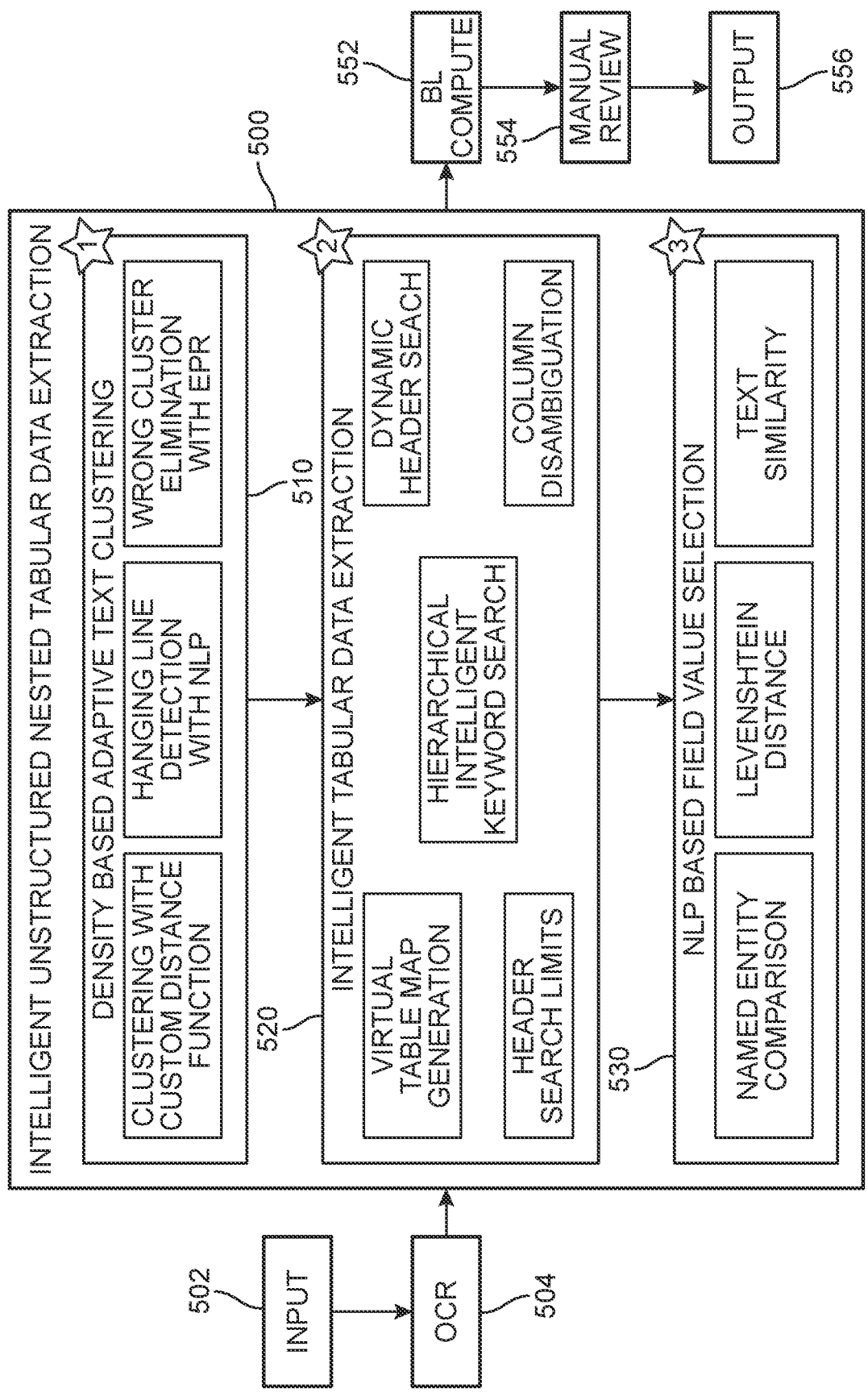
FIG. 5 is a schematic diagram presenting components for an information extraction engine, according to an embodiment.

Referring now to FIGS. 5-10, greater detail regarding the system is provided. FIG. 5 is a schematic diagram presenting an architecture for an information extraction engine used for extracting unstructured, complex and nested data tables found in unstructured documents. The model has three major components for clustering the document text, extracting the tables and selecting the right values from the table respectively.

As input 502 is received and OCR'd 504, an intelligent model 500 for unstructured nested tabular data extraction applies density-based adaptive text clustering via a first component 510, which includes clustering with a custom distance function, hanging line detection with NLP, and wrong cluster elimination with EPR. Thus, this module clusters OCR-ed text chunks based on density. The model adapts to the variations in the text density in different documents to identify the phrases, lines, or paragraphs of text. A second component 520 receives output from the first component 510 and an intelligent tabular data extraction (ITDE) algorithm is used to detect and extract tabular data. The clustered chunks are parsed, and tabular data are found and extracted, and a hierarchical intelligent keyword search is performed. In addition, the algorithm constructs a virtual table object after locating the table headers, column headers and row headers and uses the same to extract tabular data efficiently. It should be understood that the algorithm is capable of handling nested tables, dynamic headers, hierarchical table/column/row headers, and overlapping column/row values.

The output of the second component 520 is provided to a third component 530 for NLP-based field value selection. This component selects the best value out of multiple values extracted from different versions of documents from multiple document types using named entity comparison, Levenshtein distance, and text similarity techniques. The extracted data is computed 552, and in some embodiments, a manual review 554 is performed, before a final output 556 is generated.

For purposes of illustration, one use case example involving the credit services industry will now be discussed. It may be appreciated that mortgage servicers must have a robust quality control process in place to avoid penalties, and drive higher quality of customer service and efficiency. Maintaining a robust plan of quality control review and auditing ensures that servicers are in compliance with guidelines required by the regulators.

A loan audit—and therefore the proposed system—is therefore critical to a servicer's business. For example, incorrect set-up will lead to untimely premium payment of taxes and mortgage insurance, resulting in penalties. The system ensures payments schedules are set up correctly to avoid suspension and/or reconciliation, post the correct effective date of when a mortgage payment was received, verify the delivery of an annual escrow account statement to borrowers within 30 days of the end of the computation year, and ensure escrow, principal or interest amounts, borrower name, property address, or calculation of interest rate are captured correctly to service the loan effectively. With conventional methods, relying heavily on manual reviews of financial statement (which include have tables, sub-tables, and multiple sections where required details must be entered into the OSAR output). Such a complex manual process is more susceptible to error and consumes more time.

Furthermore, current tabular data extraction technologies are not sufficient for extracting complex tables. They either import pure tabular data or extract non-tabular data based on keywords. The challenges faced in extracting complex tables include: (a) Paragraph/Phrase Identification—when paragraphs or phrases are very close to each other and have only a single line of text, it becomes difficult to decide if they are separate paragraphs/phrases or parts of same paragraph; (b) Nested table/row/column headers—the headers, column headers and row headers in tables can have multiple nested sub-headers in hierarchical format; (c) Tabular Data with multiple sections—when data in a table are separated into different sections it becomes necessary to group the data and associate the data to relevant sections; (d) Spanning Headers—column/row headers span across multiple columns/rows depicting that data in all those columns/rows are related to that header; (e) Dynamic Headers—where a part of the table header varies to associate the table/column/row with the value of the varying part; (f) Values Overlapping Adjacent Rows/Columns—values that overlap between rows/columns need to be disambiguated to identify the correct row/column to which they belong; and (g) Extraction Efficiency/Speed—as many rows and columns of data need to be extracted, the extraction may take longer time.

The above challenges are addressed and easily managed by the disclosed systems. In different embodiments, the information extraction engine (see FIG. 5) can be used to automatically extract data from mortgage-related documents, even those with complex tabular data. The disclosed systems and methods can thus be readily applied toward the processing of invoices, escrow statements, and financial statements, and other documents.

For example, in cases where paragraphs or phrases are very close to each other and have only a single line of text, it is typically difficult to determine whether they are separate paragraphs or phrases, or actually parts of same paragraph. In different embodiments, the proposed model applies density-based adaptive text clustering to identify paragraphs and other text groups from the OCRed readable text chunks. Furthermore, edge padding ratio (EPR) and hanging line detection techniques are used by the model to identify whether two paragraphs that appear close to each other are separate paragraphs or parts of same paragraph.

Figure 6:
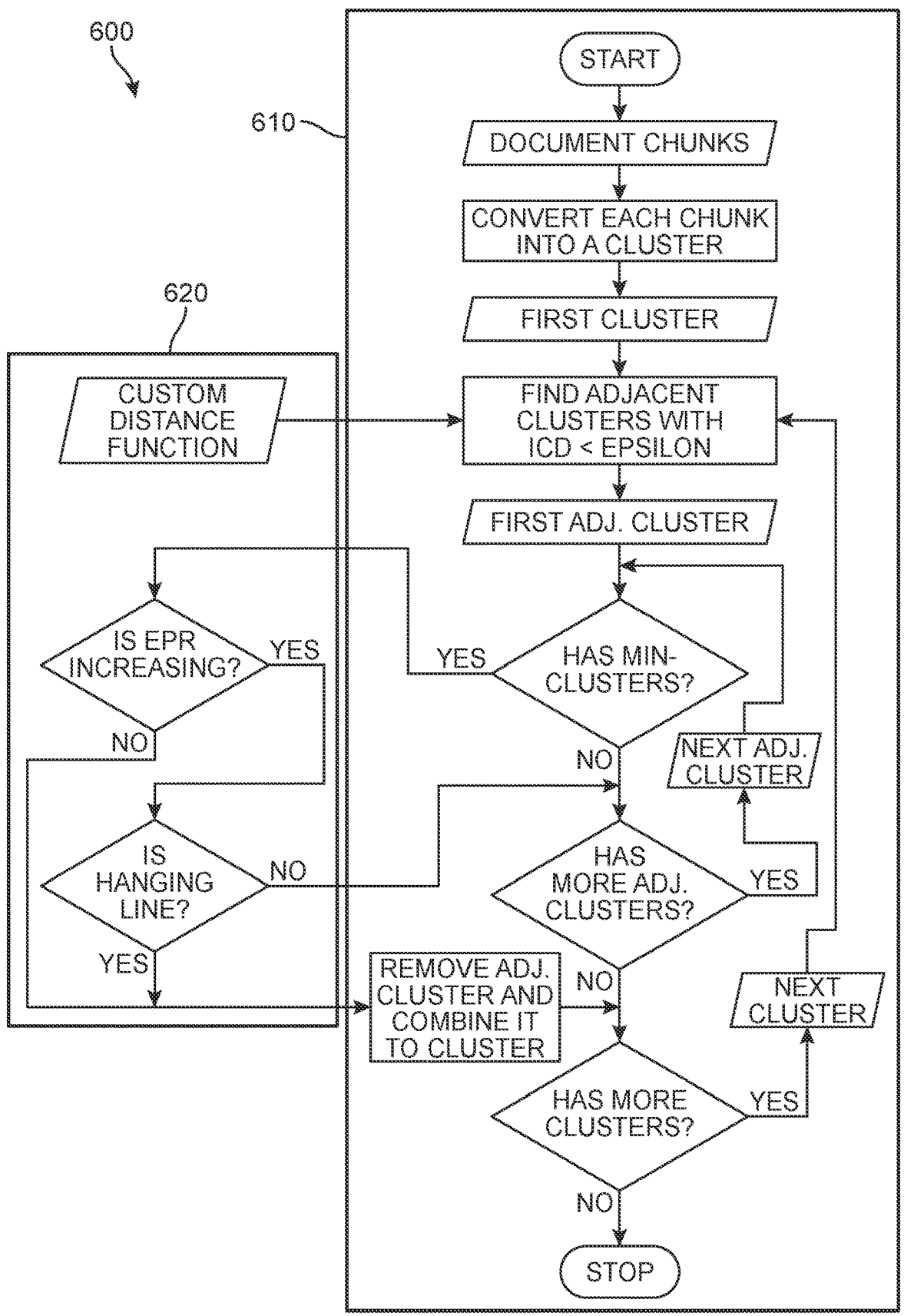
FIG. 6 is a schematic flow diagram of a density-based adaptive text clustering process, according to an embodiment.

Referring now to FIG. 6, a flow diagram depicts a process flow 600 of a customized density-based adaptive text clustering (DBSCAN) algorithm (the first component 510 of FIG. 5), demarcated into two sections for purposes of reference. At the start of a first section 610, document chunks are obtained and each chunk is converted into a cluster. For each cluster (e.g., a first cluster, a second cluster, an nth cluster, etc.), the DBSCAN algorithm determines the most likely adjacent cluster(s) with ICD<Epsilon (applying the custom distance function shown in a second section 620), which is identified as the first adjacent cluster. If the first adjacent cluster has min-clusters, the DBSCAN algorithm determines whether the EPR is increasing. If the EPR is increasing, the DBSCAN algorithm determines whether the text is a hanging line. If the EPR is not increasing and/or the text is a hanging line, the first adjacent cluster is removed, and combined with the larger (first) cluster. If the text is not a hanging line, the DBSCAN algorithm determines whether there are additional adjacent clusters. If there are more adjacent clusters, the adjacent cluster process repeats, as shown in FIG. 6. If there are no further adjacent clusters detected, the DBSCAN algorithm determines whether there are additional clusters. If there are additional clusters, the cluster process repeats, as shown in FIG. 6. If there are no further clusters, the process ends.

In other words, the DBSCAN algorithm groups points based on epsilon. When clustering text, separate paragraphs which are next to each other may be clustered as a single paragraph based on the short distance between them. To overcome this and increase accuracy, the DBSCAN algorithm calculates the EPR to identify separate paragraphs that are close to each other, but that would otherwise have been clustered as single paragraph. The EPR is calculated as the ratio of the blank areas near the edges of the rectangular area surrounding a paragraph to the total area of the paragraph. Whenever the DBSCAN algorithm attempts to combine any two clusters to form a new cluster, the EPR is calculated for the new cluster. If the new EPR value is found to be higher than the same of the individual clusters, the new cluster is not formed.

In addition, a last line of a paragraph is frequently small (i.e., shorter than the lines above it) and does not extend to the right-most corner of the paragraph. Conventional approaches therefore usually exclude the line from paragraph cluster when clustering the last line, as the EPR would increase because of the empty space at the end of the line. To overcome this deficiency, the DBSCAN algorithm applies a hanging line detection technique, which analyzes (a) alignment of the line with other lines in the current paragraph/cluster, (b) font and size similarities between the line and other lines in the current paragraph/cluster, and (c) probability prediction of text continuation from the previous line to the last line using NLP.

Figure 7:
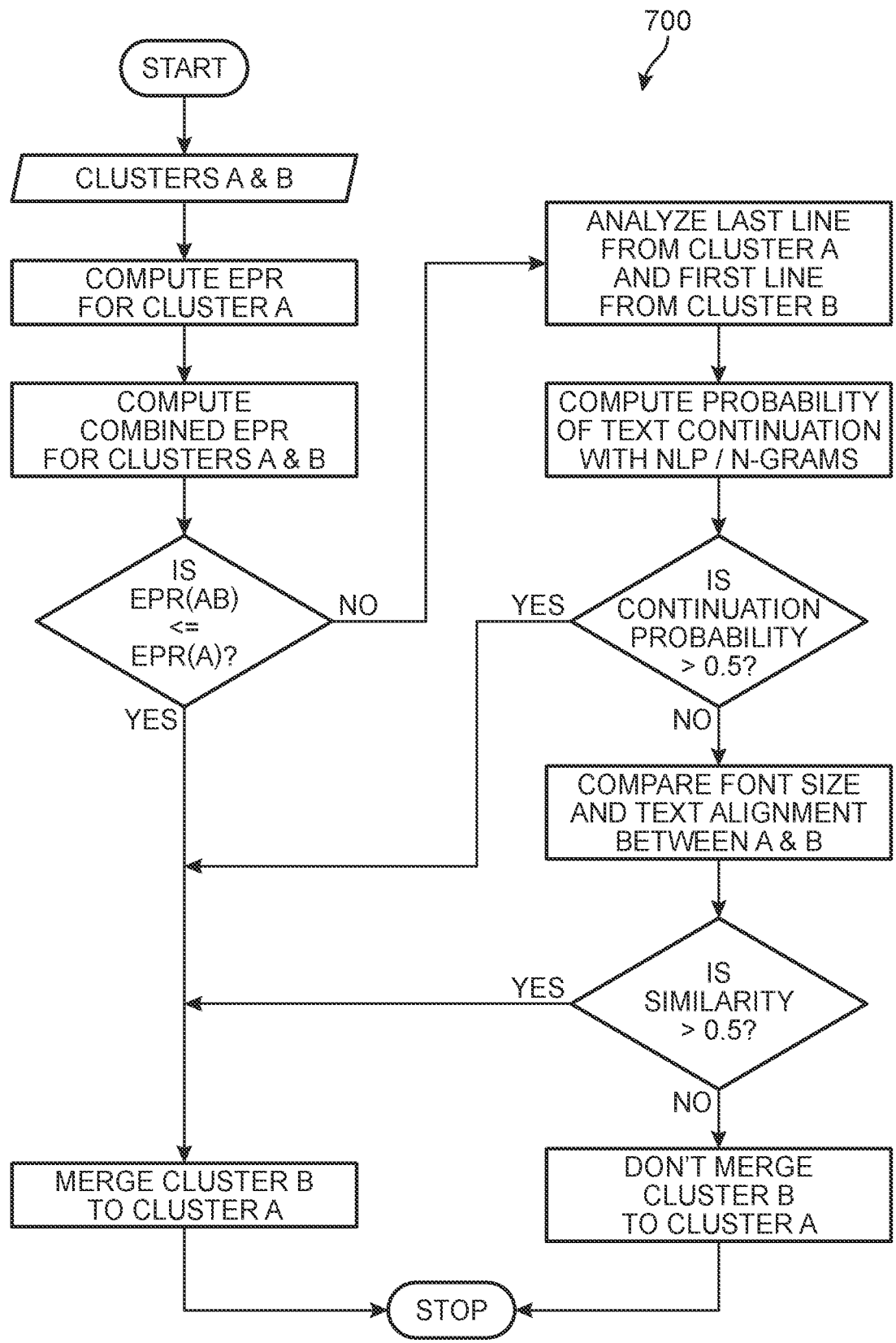
FIG. 7 is a schematic flow diagram depicting cluster validation during a density-based adaptive text clustering process, according to an embodiment.

Additional detail regarding the process of cluster validation 700 is presented with reference to FIG. 7. In FIG. 7, the text clustering algorithm can be seen to perform both wrong cluster elimination with EPR and hanging line detection with NLP. More specifically, when multiple clusters are received (e.g., Clusters A and B), the EPR will be computed for the first cluster (Cluster A), and the combined EPR for both clusters (A and B) will also be computed. If the EPR for both is less than or equal to the EPR for the first cluster, the two clusters will be merged, ending the process. If, on the other hand, the EPR for both is greater than the EPR for the first cluster, the last line from Cluster A and the last line from Cluster B are analyzed. A probability of text continuation is computed using NLP and N-grams. If the continuation probability is then greater than 0.5, the two clusters will be merged, ending the process. If the continuation probability is less than 0.5, font size and text alignment between Cluster A and Cluster B will be compared. If the similarity for these aspects is greater than 0.5, the two clusters will be merged, ending the process. If the similarity for these aspects is less than 0.5, Cluster A and Cluster B will remain separate, and the process will end.

It should be noted that the conventional distance function used for points cannot be used for chunks of text which include phrases, sentences, or paragraphs as the result generates incorrect clustering. However, the proposed modified (custom) distance function considers the minimum distance between the two chunks in x and y dimensions to calculate the inter-chunk distance, such that:

$$d_x = \min(x_a, x_b) | \text{where } x=0 \text{ if } x<0$$

$$d_y = \min(Y_a, Y_b) | \text{where } y=0 \text{ if } y<0$$

$$d = (d_x^2 + d_y^2)^{(1/2)}$$

The proposed systems are also configured to address the challenge of tabular data extraction by incorporating a variety of techniques, including (a) Hierarchical Intelligent Keyword Search (HIKS), (b) Context-based Data Grouping, (c) Spanning Header Detection, (d) Dynamic Header Search, (e) Row/Column Disambiguation, (f) Search Limits, and (g) Virtual Table Mapping.

As noted earlier, the proposed ITDE algorithm is designed to solve the problem of accurate data extraction from complex tables. Complex tables that have nested table/row or column headers cannot be extracted accurately using traditional table data extraction technologies. Instead, existing approaches have worked only with simple tabular data. In contrast, in different embodiments, the proposed ITDE algorithm incorporates the HIKS technique to identify nested table, row, and column header (as well as sub-header) structures and transform them into 'flat' format before extracting the table. Furthermore, nested (sub-header) headers are associated with parent headers to make the search context-sensitive. This enables disambiguation of identical headers that may be found in rows and columns. For example, after locating the first keyword/header, the sub-keyword/sub-header is searched within the search context of the first keyword/header.

The proposed ITDE algorithm is further configured to solve the problem of accurate data extraction when data in a table are separated into different sections, such that it becomes necessary to group the data and associate the data to relevant sections. The ITDE algorithm groups the tabular data appearing under each section separately and associates them with the relevant sections, a technique referred to herein as context-based data grouping. The HIKS technique is then used to identify the section headers as parent row headers of the row sub-headers appearing under them and the associated data are grouped under the relevant section headers.

In addition, in cases where the column and/or row headers span across multiple columns/rows depicting that data in all those columns/rows are related to that header, conventional approaches are unable to detect whether a column/row header spans across multiple columns/rows or determine the extent of the spanning necessary to accurately extract data relevant to that header. However, in different embodiments, the ITDE algorithm applies a spanning header detection technique to detect the extent to which each row/column header spans. In order to identify the spanning extent of a column header, (a) the location of all the column headers in the table are found, (b) the boundaries of the content values found under the column headers are computed, and (c) the spanning width of the current column header is then computed-based on the boundaries of the surrounding headers and the column data. In other words, spanning header detection enables the detection of headers that span across multiple columns/rows and associates them with those columns/rows.

Furthermore, it can be appreciated that headers may contain a variable part, used to label the data in the table as being associated with the value of that variable part. In those cases, the extraction program would need to identify the varying value and associate it with the data in the table. For example, operating statements are normally provided for different months or other periods in an identical layout and/or format with the header describing the period the data belongs to. In some embodiments, the ITDE algorithm uses a dynamic header search technique to identify the variable part in dynamic headers and associate the value of the variable part to the data in the table. This enables extraction of multiple sets of data available in identical layout or format and storing them efficiently, and further enables identification of headers in which the content or a part of the content is bound to change.

There may also be cases where text or other data appearing in a row or column of a table overlaps other rows or columns. Such overlapping text is often mistakenly assigned to wrong the rows or columns. However, in different embodiments, the ITDE algorithm identifies the correct row or column to which an overlapping value belongs by computing the extent of overlap and the similarity of the overlapping text to the other values in the column/row that is considered. This approach enables identification of values belonging to a column when values from nearby columns are large in size and extend inside the current column.

Finally, it may be appreciated that the conventional extraction of complex tables consumes extensive periods of time as values need to be extracted from multiple nested columns/rows, which requires a search of values in a column or row multiple times. In order to increase extraction speed and efficiency, the ITDE algorithm generates a virtual table map (a virtual in-memory table object) when locating the headers, row headers, and column headers of the table to be extracted. The virtual table map is then used during extraction to loop through the columns and rows in the table and extract the values. Search limits are also used to limit the search context of a keyword or header, where limits are defined with search text or max distance from the parent keyword/header in both horizontal and vertical directions.

Figure 8:
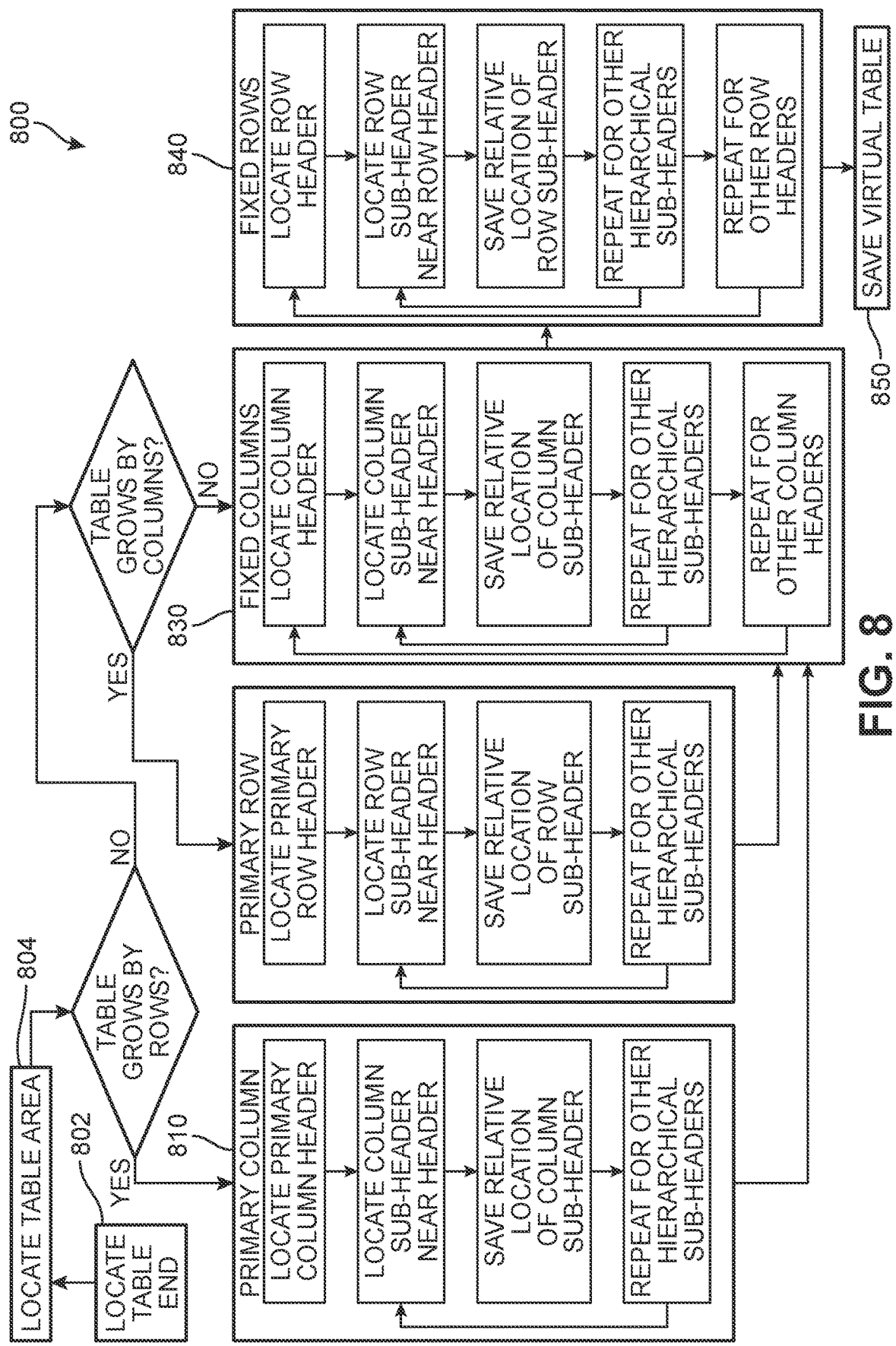
FIG. 8 is a schematic flow diagram of an intelligent tabular data extraction process, according to an embodiment.

For purposes of illustration, a schematic flow diagram depicting an embodiment of the ITDE process 800 is shown in FIG. 8. In a first step 804, the table end is located. In a second step 804, the table area is located. If the table grows by rows, the process moves to a first stage 810, in which the primary column header is located, the column sub-header near the header is located, and the relative location of the column sub-header is saved. This cycle is repeated for other hierarchal sub-headers, and then moves to a third stage 830. If the table grows by columns, the process moves to a second stage 820, in which the primary row header is located, the row sub-header near the header is located, and the relative location of the row sub-header is saved. The cycle is repeated for other hierarchal sub-headers, and then moves to the third stage 830.

In addition, in cases in which the table does not grow by either rows or columns, the process moves directly to the third stage 830, in which the column header is located, the column sub-header near the header is located, the relative location of the column sub-header is saved. The cycle is repeated for other hierarchal sub-headers, and then repeated for other column headers. Following the third stage 830, a fourth stage 840 occurs in which the row header is located, the row sub-header near the row header is located, and the relative location of the row sub-header is saved. The cycle is repeated for other hierarchal sub-headers, and then repeated for other row headers. Once the table has been fully processed, the virtual table is saved in a third step 850.

Figure 9:
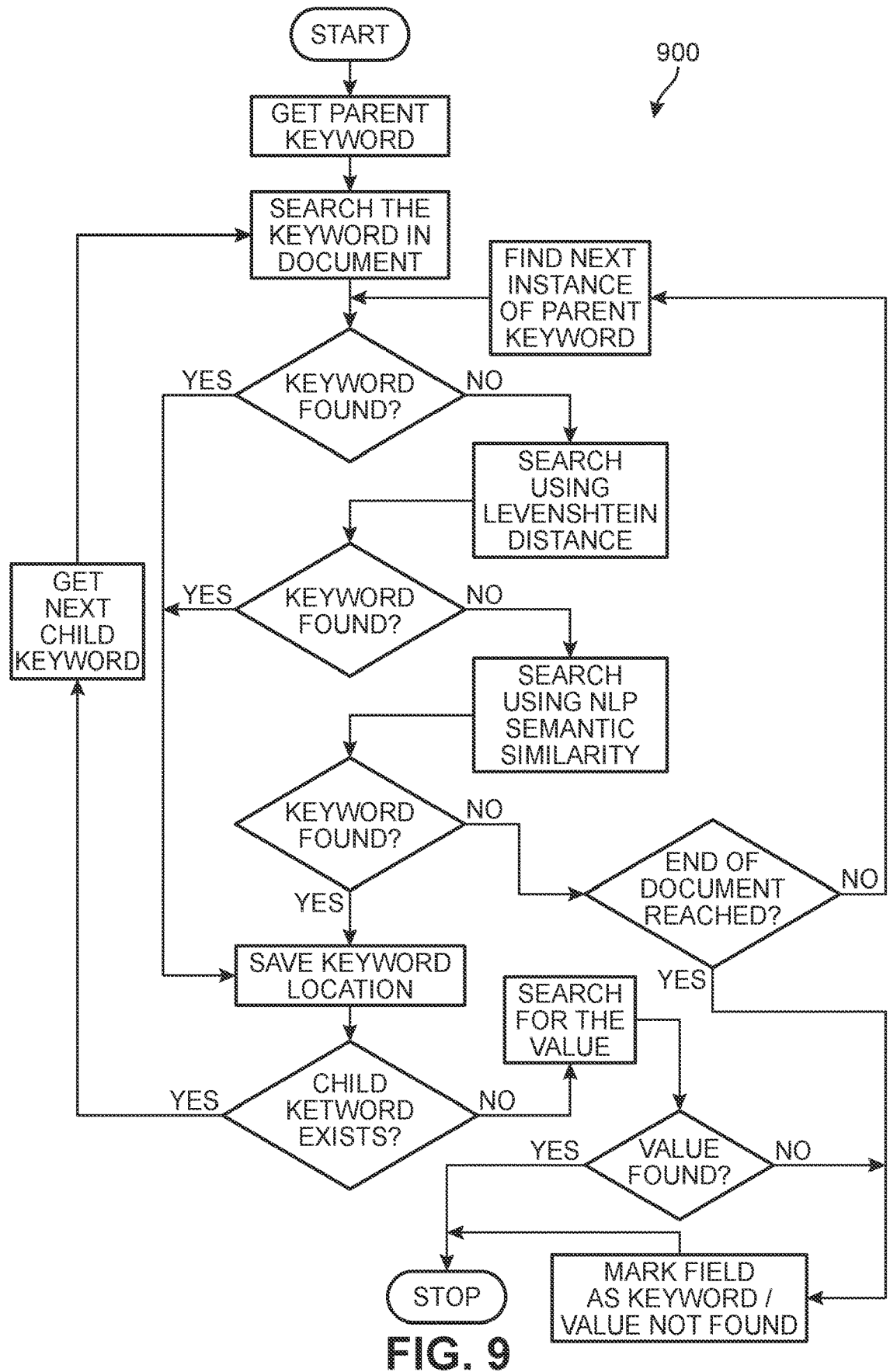
FIG. 9 is a schematic flow diagram of a hierarchical intelligent keyword search process, according to an embodiment.
Figure 10:
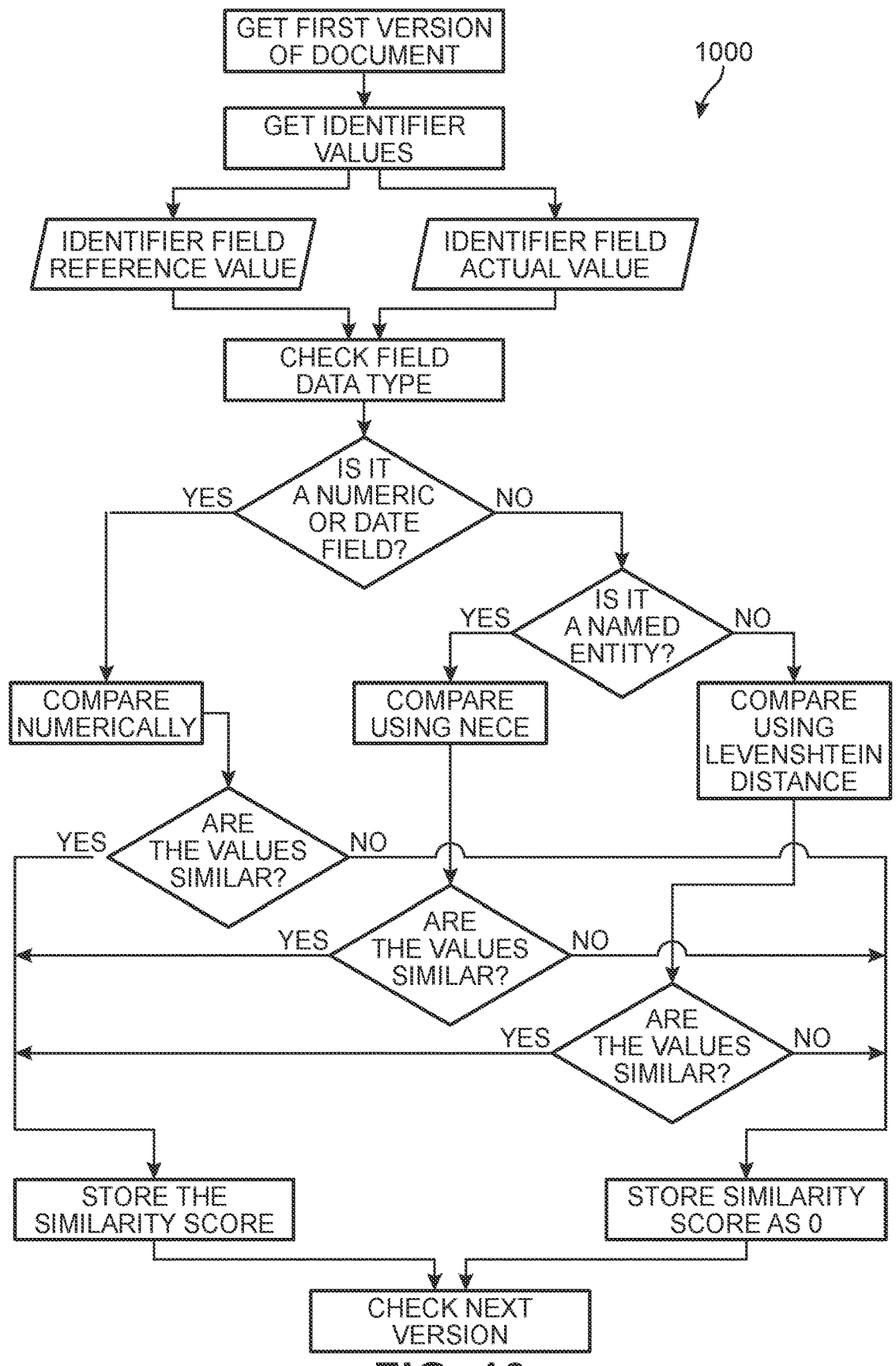
FIG. 10 is a schematic flow diagram of an NLP-based field value selection process, according to an embodiment.

As noted earlier, the ITDE algorithm also incorporates a HIKS technique. A flow diagram depicting an embodiment of a HIKS process 900 is presented in FIG. 9. As shown in FIG. 9, once a parent keyword is obtained, a search for the keyword in the document is performed. If the keyword is found, the keyword location is saved. If the keyword is not found, a search using Levenshtein distance is performed. If the keyword is found, the keyword location is saved.

If the keyword is not found, a search using NLP semantic similarity is performed. If the keyword is found, the keyword location is saved. If the keyword is not found, and the end of the document has been reached, the field is marked as keyword or value not found, and the process ends. If the keyword is not found and the end of the document has not yet been reached, the process repeats after finding the next instance of a parent keyword. If, following the saving of a keyword location, a child keyword is determined to exist, the next child keyword is obtained and the keyword is searched in the document. If no child keyword exists, a search for the value is performed. If the value is found, the process can end. If no value is found, the field is marked as keyword or value not found, and the process ends.

For purposes of clarity, additional details regarding the NLP-based field value selection process will now be discussed. It can be appreciated that a field may be available in multiple document types. For example, a field "Borrower Name" can be available in Note, DOT and LA document types. The model applies NLP-based field value selection by extracting fields from multiple versions of documents belonging to the multiple document types in which they are available. In each document type, a version of the document is selected (see FIG. 10) from the multiple versions-based on the values of identifier fields and flagged as selected. The value for the field is then selected from the multiple values of that field from different document types, based on historical data and business rules.

In other words, a version of the document is selected from multiple versions of a document type, by comparing the reference values of identifier fields with the actual values from the document version. A document version selection process 1000 is depicted as a flow diagram in FIG. 10. In a first step, a first version of the document is received, and identifier values obtained. For each identifier value, the identifier field reference value and the identifier field actual value is determined. For both of these values, the data type for the field is checked, and based on the field data type, different methods are used to compare the reference and extracted values.

If the data type is a numeric or date field, the reference and extracted values are compared numerically. If instead the data type is a named entity, a Named Entity Comparison Engine (NECE) is used for comparing named entities, where NECE is a model trained for named entity comparison using features like nicknames, order mismatch, titles, salutations, and generation suffixes. If the data type is neither a numeric/date field nor a named entity, the reference and extracted values are compared using Levenshtein distance. For other text fields, NLP techniques are used for text similarity check. At each of these comparison stages, if the values are deemed sufficiently similar, the similarity score is stored and the next version of the document is processed. If the values are deemed to be sufficiently dissimilar, a similarity score of zero is stored, and the next version of the document is processed. After computing the similarity score for all versions of the document, the version with highest similarity score is selected.

As a general matter, the extracted data will be processed for use based in part on the intended use of the data and specified document type. Identified fields and anomalies can be automatically transmitted and displayed to an operations team member assigned to monitor the system. The metrics, field values, and other data may be manipulated, analyzed and displayed via a tool and/or user interface such as a visualization dashboard. The tool and/or user interface may allow and/or provide for a system administrator to query and alert on mortgage applications and access a visual display of the data. In some embodiments, the data is analyzed and visually displayed using an open source software platform to allow an administrator or other support end-users to query and generate alerts and notifications on specific metrics and to create dashboards to visually display time series data. The reports may be chart reports, dashboards, or other reports. An example of an open source software platform for time series analytics and visualization is Grafana, which is provided by GrafanaLabs. Other dashboards such as Guidewire, JSON, Llamasoft, Domo, and Tableau, or others known in the art may be implemented. In some embodiments, the analytics and visualization platform is hosted in the cloud, while in other embodiments the analytics and visualization platform is hosted locally on a server.

For purposes of this disclosure, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

For example, an operator can readily access specific types of data based on a plurality of filters such as record date, invoice type, issue type, date of last status update, payment note value, name, etc. Additional options can be offered that can, for example, be used to trigger a display of the digitized and/or OCR-ed document image, or enable verification of some auditing stage. Thus, in different embodiments, the visualization dashboard can serve as an inquiry interface for review of documents and extracted data, where various filters can be applied to isolate specific types of information.

Figure 11:
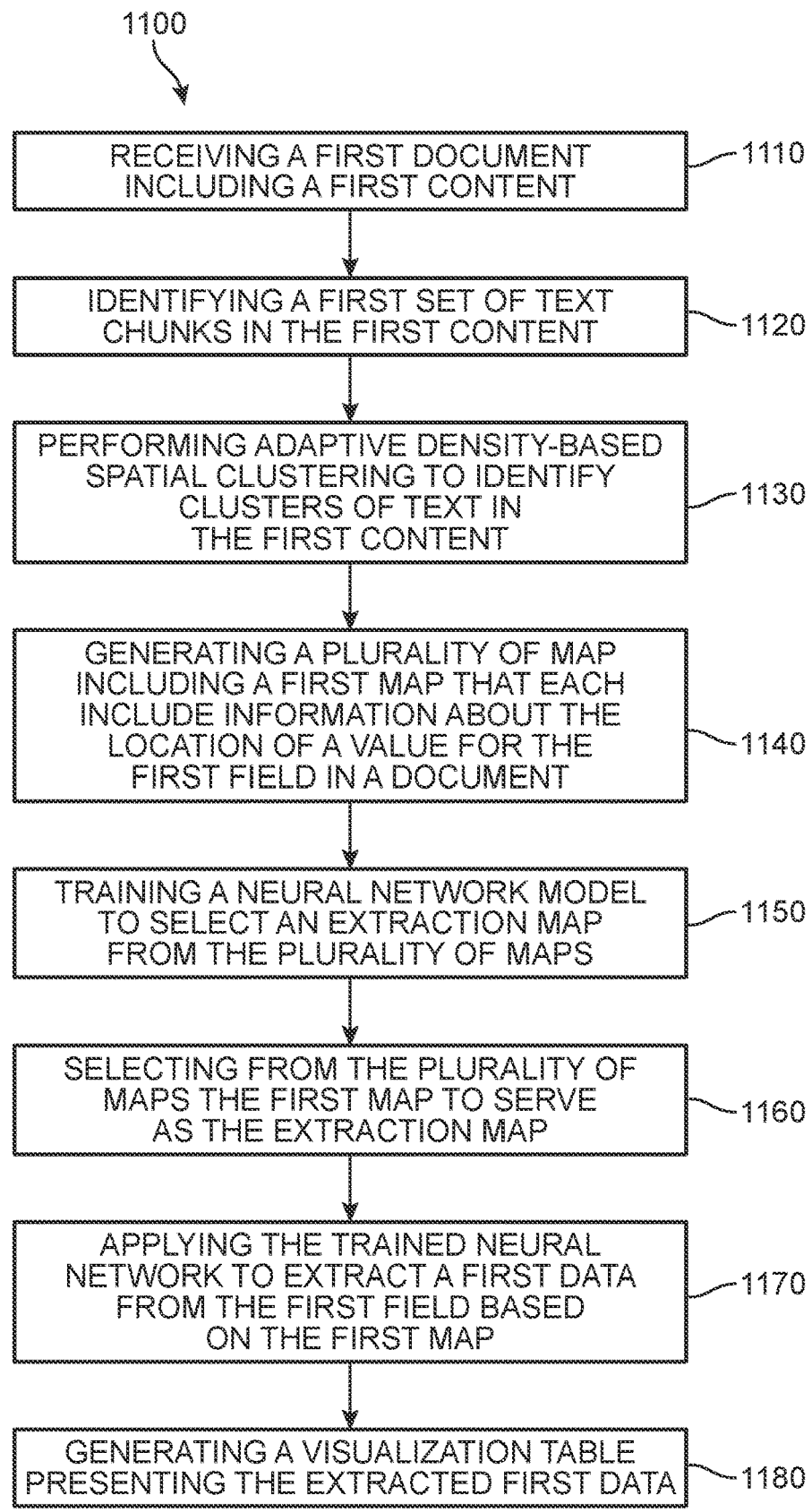
FIG. 11 is a flow chart depicting a method of intelligent data extraction, according to an embodiment.

FIG. 11 is a flow chart illustrating an embodiment of a method 1100 of intelligent data extraction from documents. As shown in FIG. 11, a first step 1110 of the method 1100 includes receiving, at a server and from a first data source, a first document including a first content, and a second step 1120 of identifying a first set of text chunks in the first content. The method 1100 also includes a third step 1130 of performing, at the server, adaptive density-based spatial clustering on the first set of text chunks, thereby identifying clusters of text in the first content, and a fourth step 1140 of generating a plurality of maps based on values captured manually from a set of training documents, the plurality of maps including a first map, and each map including information about the location of a value for the first field in a document. A fifth step 1150 includes training, at the server, a neural network model to select an extraction map from the plurality of maps that is most likely to accurately extract data from the first field of the first document based on the identified clusters of text. In addition, a sixth step 1160 includes selecting from the plurality of maps, at the server and using the neural network model, the first map to serve as the extraction map. Furthermore, the method 1100 includes a seventh step 1170 of applying the trained neural network to extract, at the server, a first data from the first field based on the first map and an eighth step 1180 of generating a visualization table/dashboard presenting the extracted first data.

In other embodiments, the method may include additional steps or aspects, particularly in cases where the document includes tabular data (e.g., charts, spreadsheets, tables, etc.). For example, the method can further include steps of generating a virtual table based on the location of any table headers, column headers, and row headers in the first document, and using the virtual table to more efficiently extract data from the first document. In another example, the method can further include a step of applying a hierarchical intelligent keyword search technique to identify nested tables, rows, and/or column header structures in a table, thereby disambiguating any identical headers. In some embodiments, the method also includes a step of applying a spanning header detection technique to detect the extent to which each row and/or header spans across a table. In one embodiment, the method includes a step of applying a dynamic header search technique to identify a dynamic header variable and associate the data in a table with the variable. In another example, the method may also include a step of computing an extent of text overlap and similarity of the overlapping text to other values in the same row and/or column in order to identify the correct row and/or column to which an overlapping value belongs.

In different embodiments, the method can also include a step of using edge padding ratio and hanging line detection techniques to determine if two clusters of text belong to two separate paragraphs or only one paragraph. Furthermore, in some embodiments, the method includes calculating the inter-chunk distance between two chunks during the clustering process based on a minimum distance between the two chunks in x and y dimensions.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random-access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of intelligent data extraction, the method comprising:
   receiving, at a server and from a first data source, a first document including a first content;
   identifying a first set of text chunks in the first content;
   performing, at the server, adaptive density-based spatial clustering on the first set of text chunks, thereby identifying clusters of text in the first content;
   generating a plurality of maps based on values captured manually from a set of training documents, the plurality of maps including a first map, and each map including information about the location of a value for the first field in a document;
   training, at the server, a neural network model to select an extraction map from the plurality of maps that is most likely to accurately extract data from the first field of the first document based on the identified clusters of text;
   selecting from the plurality of maps, at the server and using the neural network model, the first map to serve as the extraction map;
   applying the trained neural network to extract, at the server, a first data from the first field based on the first map; and
   generating a visualization table presenting the extracted first data.

2. The method of claim 1, wherein the first document includes tabular data, and the method further comprises:
   generating a virtual table based on the location of any table headers, column headers, and row headers in the first document; and
   using the virtual table to more efficiently extract data from the first document.

3. The method of claim 1, wherein the first document includes tabular data, and the method further comprises applying a hierarchical intelligent keyword search technique to identify nested tables, rows, and/or column header structures in a table, thereby disambiguating any identical headers.

4. The method of claim 1, wherein the first document includes tabular data, and the method further comprises applying a spanning header detection technique to detect the extent to which each row and/or header spans across a table.

5. The method of claim 1, wherein the first document includes tabular data, and the method further comprises applying a dynamic header search technique to identify a dynamic header variable and associate the data in a table with the variable.

6. The method of claim 1, wherein the first document includes tabular data, and the method further comprises computing an extent of text overlap and similarity of the overlapping text to other values in the same row and/or column in order to identify the correct row and/or column to which an overlapping value belongs.

7. The method of claim 1, further comprising using edge padding ratio and hanging line detection techniques to determine if two clusters of text belong to two separate paragraphs or only one paragraph.

8. The method of claim 1, further comprising calculating the inter-chunk distance between two chunks during the clustering process based on a minimum distance between the two chunks in x and y dimensions.

9. A system for intelligent data extraction, the system comprising:
   a processor;
   machine-readable media including instructions which, when executed by the processor, cause the processor to:
      receive, at a server and from a first data source, a first document including a first content;
      identify a first set of text chunks in the first content;
      perform, at the server, adaptive density-based spatial clustering on the first set of text chunks, thereby identifying clusters of text in the first content;
      generate a plurality of maps based on values captured manually from a set of training documents, the plurality of maps including a first map, and each map including information about the location of a value for the first field in a document;
      train, at the server, a neural network model to select an extraction map from the plurality of maps that is most likely to accurately extract data from the first field of the first document based on the identified clusters of text;
      select from the plurality of maps, at the server and using the neural network model, the first map to serve as the extraction map;
      apply the trained neural network to extract, at the server, a first data from the first field based on the first map; and
      generate a visualization table presenting the extracted first data.

10. The system of claim 9, wherein the first document includes tabular data, and the instructions further cause the processor to
   generate a virtual table based on the location of any table headers, column headers, and row headers in the first document; and
   use the virtual table to more efficiently extract data from the first document.

11. The system of claim 9, wherein the first document includes tabular data, and the instructions further cause the processor to apply a hierarchical intelligent keyword search technique to identify nested tables, rows, and/or column header structures in a table, thereby disambiguating any identical headers.

12. The system of claim 9, wherein the first document includes tabular data, and the instructions further cause the processor to apply a spanning header detection technique to detect the extent to which each row and/or header spans across a table.

13. The system of claim 9, wherein the first document includes tabular data, and the instructions further cause the processor to apply a dynamic header search technique to identify a dynamic header variable and associate the data in a table with the variable.

14. The system of claim 9, wherein the first document includes tabular data, and the instructions further cause the processor to compute an extent of text overlap and similarity of the overlapping text to other values in the same row and/or column in order to identify the correct row and/or column to which an overlapping value belongs.

15. The system of claim 9, wherein the instructions further cause the processor to use edge padding ratio and hanging line detection techniques to determine if two clusters of text belong to two separate paragraphs or only one paragraph.

16. The system of claim 9, wherein the instructions further cause the processor to calculate the inter-chunk distance between two chunks during the clustering process based on a minimum distance between the two chunks in x and y dimensions.

17. A system comprising one or more computers and one or more storage devices storing instructions that are operable, when executed by the one or more computers, to cause the one or more computers to:

receive, at a server and from a first data source, a first document including a first content;

identify a first set of text chunks in the first content;

perform, at the server, adaptive density-based spatial clustering on the first set of text chunks, thereby identifying clusters of text in the first content;

generate a plurality of maps based on values captured manually from a set of training documents, the plurality of maps including a first map, and each map including information about the location of a value for the first field in a document;

train, at the server, a neural network model to select an extraction map from the plurality of maps that is most likely to accurately extract data from the first field of the first document based on the identified clusters of text;

select from the plurality of maps, at the server and using the neural network model, the first map to serve as the extraction map;

apply the trained neural network to extract, at the server, a first data from the first field based on the first map; and generate a visualization table presenting the extracted first data.

18. The system of claim 17, wherein the first document includes tabular data, and the instructions further cause the one or more computers to:

generate a virtual table based on the location of any table headers, column headers, and row headers in the first document; and use the virtual table to more efficiently extract data from the first document.

19. The system of claim 17, wherein the first document includes tabular data, and the instructions further cause the one or more computers to apply a hierarchical intelligent keyword search technique to identify nested tables, rows, and/or column header structures in a table, thereby disambiguating any identical headers.

20. The system of claim 17, wherein the first document includes tabular data, and the instructions further cause the one or more computers to apply a spanning header detection technique to detect the extent to which each row and/or header spans across a table.

* * * * *